W. F. HEBRANK.
ASSORTING MACHINE.
APPLICATION FILED APR. 7, 1910.
1,020,981.
Patented Mar. 26, 1912.
3 SHEETS—SHEET 3.
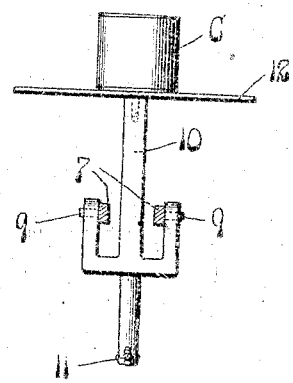
Fig. III.
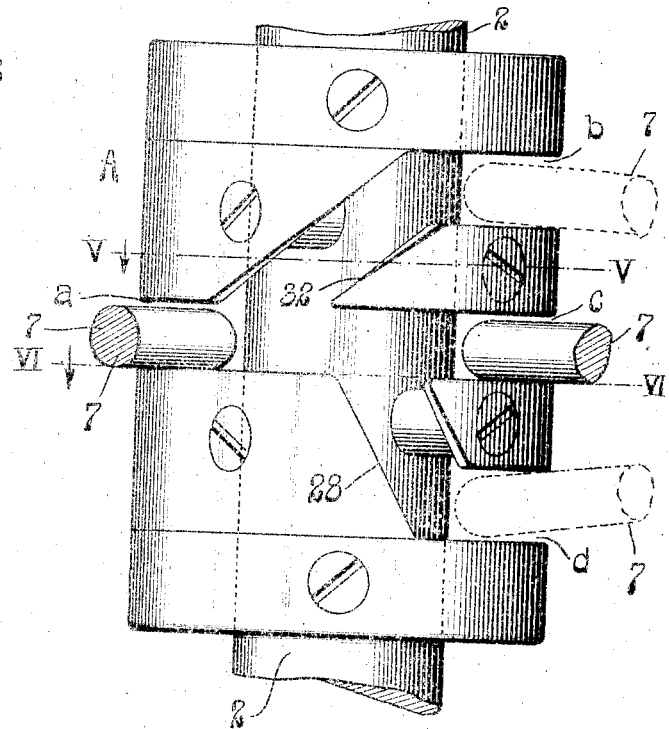
Fig. IV.
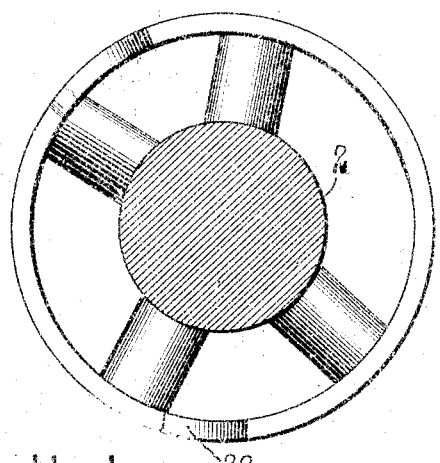
Fig. VI.
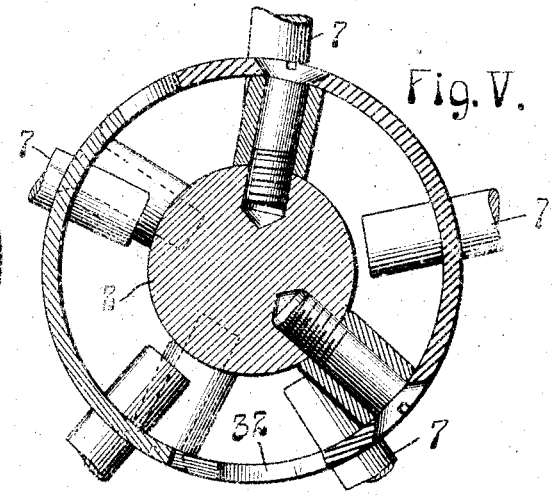
Fig. V.
Attest
A. J. McCauley
E. D. Lewis
Inventor:
W. F. Hebrank
by E. J. Knight
Att'y.

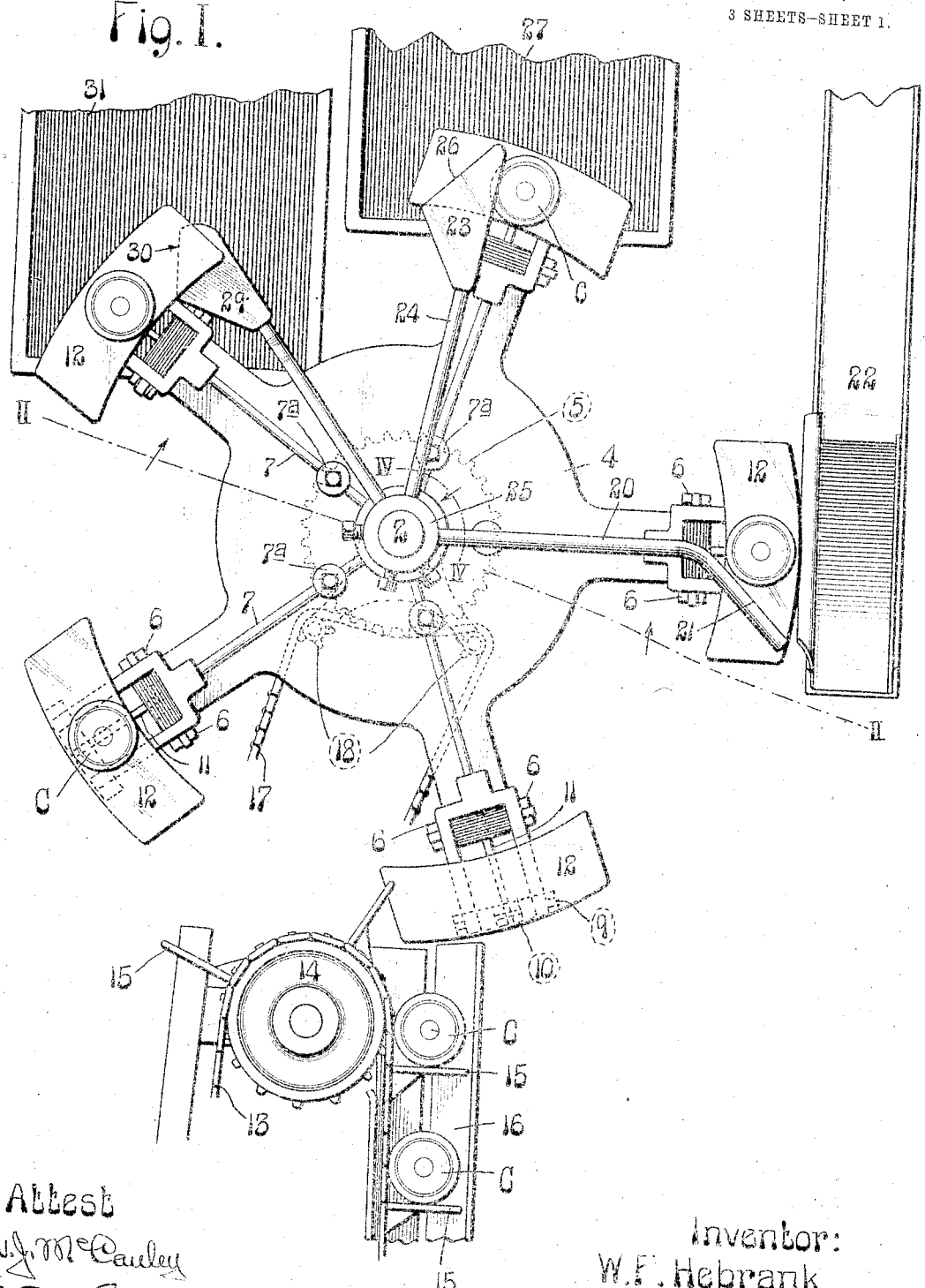

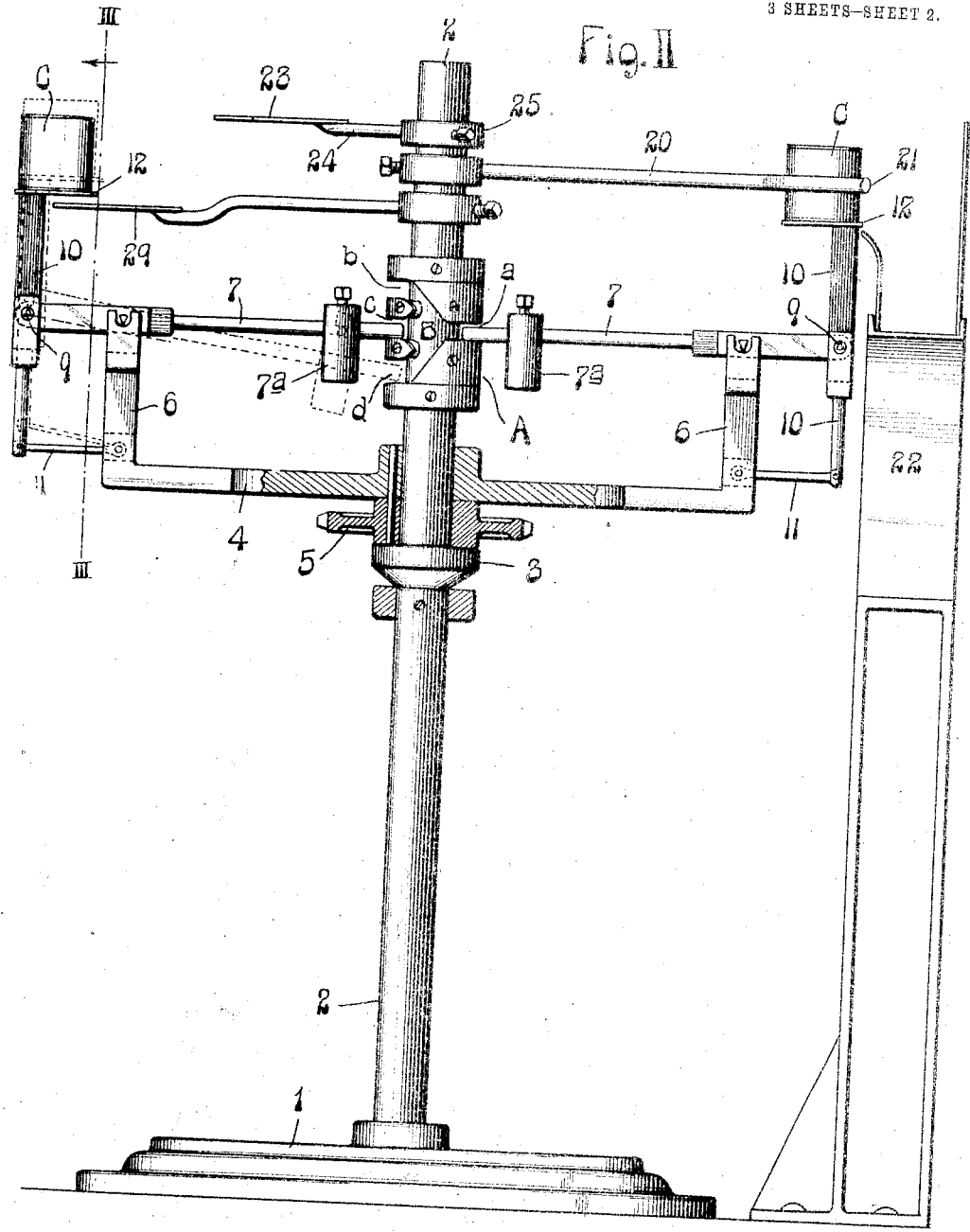

UNITED STATES PATENT OFFICE.

WILLIAM F. HEBRANK, OF HIGHLAND, ILLINOIS.

ASSORTING-MACHINE.

1,020,981.

Specification of Letters Patent. Patented Mar. 26, 1912.

Application filed April 7, 1910. Serial No. 553,907.

*To all whom it may concern:*

Be it known that I, WILLIAM F. HEBRANK, a citizen of the United States of America, residing in Highland, in the county of Madison and State of Illinois, have invented certain new and useful Improvements in Assorting-Machines, of which the following is a full, clear, and exact description, reference being had to the accompanying drawings, forming part of this specification.

My invention relates to a machine for assorting articles or packages of different weights, at different planes the object being to produce a very simple and accurate machine of this character that is devoid of weak and complicated mechanism.

In the preferred form of my invention, the articles to be assorted are fed onto a revolving weighing device and said articles are thereafter automatically discharged at different planes into three different receptacles according to their weights. These three receptacles are preferably arranged at different points and while one of them receives articles of a predetermined weight, the other two receive the lighter and heavier articles. It will be understood, however, that the lighter and heavier articles could, if desired, be discharged into the same receptacle.

Figure I is a top or plan view of a machine constructed in accordance with my invention. Fig. II is a vertical section taken approximately on line II—II, Fig. I. Fig. III is a section taken on line III—III, Fig. II. Fig. IV is a detail section taken on line IV—IV, Fig. I, illustrating a stationary cam which coöperates with the weighing device. Fig. V is a horizontal section taken on line V—V, Fig. IV, and Fig. VI is a similar view taken on line VI—VI, Fig. IV.

In the accompanying drawings: 1 designates a base plate (see Fig. II) surmounted by a column 2, provided with a collar 3. A spider 4 rotatable on the column has secured to it a sprocket wheel 5 which rests on the collar 3.

6 designates posts extending upwardly from the ends of the arms of the spider 4 and furnishing fulcrums for scale beams 7. Each scale beam carries an adjustable weight 7ª and has a bifurcated outer end that is pivoted at 9 to a vertically movable support 10, the lower end of said support being connected to the rotatable spider by a pivoted link 11. Flat plates 12 are fastened to the upper ends of the supports 10 for the purpose of receiving the articles to be weighed and separated.

In Fig. I, I have shown a feeding device or conveyer comprising a sprocket chain 13 mounted on a drive wheel 14 and having flights 15 adapted to push the articles to be weighed through a runway 16. This feeding device may, if desired, lead from a package or can filling machine, and I have herein shown the articles to be weighed in the form of cans C which have been previously filled. The floor of the runway 16 is flush with, or slightly above, the top face of the plates 12, and the flights therefore operate to push the cans from the runway 16 onto the plates 12 of the revolving weighing device.

Rotary motion is imparted to the spider 4 by a chain 17 which passes over idle pinions 18 and meshes with the sprocket wheel 5. The spider 4 and sprocket chain 13 preferably move in unison and are timed so as to cause the cans C to pass onto the plates 12 while the latter pass the end of the runway 16. When a can is fed onto one of the plates 12, it tends to operate the scale beam 7, but is temporarily prevented from doing so by a stationary cam A, rigidly secured to the central column 2. This cam is provided with a central guideway *a*, an upper guideway *b*, a middle guideway *c*, and a lower guideway *d*, which receive the inner ends of the scale beams 7 and prevent them from moving vertically after said scale beams have been actuated by reason of the influence of the weight of the cans C thereon. Immediately after one of the plates 12 receives a can, the corresponding scale beam 7 passes from the central guideway *a* and reaches a point B in the cam A (see Fig. II), and said scale beam is then free to move vertically and enter either the guideway *b* or the guideway *d*, or remain in a horizontal position and pass into the middle guideway *c*. If the can possesses the correct predetermined weight, the scale beam 7 will move into the middle guideway *c*, and as the spider 4 continues to revolve, will pass out at the opposite end of said middle guideway (see Fig. IV) and enter the central guideway *a*. At this time, the can is engaged by a stationary middle sweep arm 20, adjustably mounted on the column 2, and having an inclined face 21 which engages the can and causes it to be discharged from the plate 12 on which it rests into a receiving chute 22. This chute only receives cans possessing the correct or predetermined weight.

Light cans allow the scale beams to move downwardly and enter the lower guideway $d$ in the cam A, when said scale beams reach the point B in Fig. II (see dotted lines). It will be seen that this action moves the cans upwardly into alinement with a cam faced upper plate 23, the latter being secured to a rod 24 mounted in a collar 25 that is adjustably mounted on the column 2. Cans of the correct weight pass under the upper plate 23, but the light cans being located in a higher plane engage the inclined face 26 and are discharged into the receptacle 27 (see Fig. I). After a light can has been discharged, the scale beam continues to move around in the lower guideway $d$ until it reaches the inclined face 28 of the cam A (see Fig. IV); the scale beam then moves upwardly and enters the central guideway $a$.

Heavy cans tend to move the inner ends of the scale beams 7 upwardly, and when said beams are caused to rise at B (see Fig. II) they enter the upper guideway $b$. This action moves the can supporting plate 12 below a stationary ejector lower member 29 and as the can engages the inclined face 30 on said lower member (see Fig. I), it is automatically discharged into a receptacle 31. After a heavy can has been discharged from a plate 12, the weight $7^a$ tends to move the inner end of the scale beam downwardly and is allowed to do so when said scale beam reaches the inclined face 32 of the cam A (see Fig. IV), this downward movement causing the scale beam to enter the central guideway $a$ of the cam.

The cam A, wherein the opposite ends of the upper, middle and lower guideways $b$, $c$ and $d$ respectively communicate with the opposite ends of the central guideway $a$, forms an important part of this invention because it prevents the cans from moving vertically after they have been properly moved by the weighing device. The stationary ejectors located in different planes and adapted to discharge cans of different weights are also an important part of this invention.

I claim:

In an assorting machine, the combination with a central support, of a radial arm rotatably mounted on said support and provided with a vertically projecting portion or post at one extremity, a scale beam fulcrumed on the upper end of said support and provided with a pivotally mounted support at its outer end, the last named support being provided with a depending portion, a guide link connecting said depending end to the upwardly projecting end of said rotatable arm, said link being adapted to hold the last said support in vertical position during the vibratory movement of the scale beam, a supporting plate or table surrounding the upper end of said vertical support, and means carried by the first said central support for removing an article from said table plate.

WILLIAM F. HEBRANK.

In the presence of—
THEO. ITTUER,
L. E. BLACET.